(12) United States Patent
Ayukawa et al.

(10) Patent No.: US 7,947,188 B2
(45) Date of Patent: May 24, 2011

(54) METHOD FOR MANUFACTURING CPP-TYPE MAGNETORESISTANCE EFFECT ELEMENT

(75) Inventors: Toshiyuki Ayukawa, Tokyo (JP); Shinji Hara, Tokyo (JP); Daisuke Miyauchi, Tokyo (JP); Takahiko Machita, Tokyo (JP); Yoshihiro Tsuchiya, Tokyo (JP)

(73) Assignee: TDK Corporation, Tokyo (JP)

( * ) Notice: Subject to any disclaimer, the term of this patent is extended or adjusted under 35 U.S.C. 154(b) by 327 days.

(21) Appl. No.: 12/318,481

(22) Filed: Dec. 30, 2008

(65) Prior Publication Data

US 2010/0163519 A1    Jul. 1, 2010

(51) Int. Cl.
    *B44C 1/22*    (2006.01)
(52) U.S. Cl. ............... 216/22; 216/75; 216/77; 216/78; 216/100; 216/102
(58) Field of Classification Search .......... 216/22, 216/75, 77, 78, 100, 102
    See application file for complete search history.

(56) References Cited

U.S. PATENT DOCUMENTS

| | | | |
|---|---|---|---|
| 6,141,190 A * | 10/2000 | Nakamoto et al. | 360/324 |
| 6,146,775 A * | 11/2000 | Fujita et al. | 428/811.2 |
| 6,591,481 B2 * | 7/2003 | Shimazawa et al. | 29/603.18 |
| 2007/0264423 A1 * | 11/2007 | Miura et al. | 427/127 |
| 2007/0281079 A1 * | 12/2007 | Carey et al. | 427/131 |
| 2008/0068764 A1 * | 3/2008 | Fukuzawa et al. | 360/324.1 |
| 2008/0239585 A1 * | 10/2008 | Ousugi et al. | 360/319 |
| 2009/0154029 A1 * | 6/2009 | Iwasaki | 360/319 |
| 2009/0277870 A1 * | 11/2009 | Sasaki et al. | 216/22 |

FOREIGN PATENT DOCUMENTS

| | | |
|---|---|---|
| JP | A-10-255228 | 9/1998 |
| JP | A-2004-253593 | 9/2004 |
| JP | A-2005-032780 | 2/2005 |
| JP | A-2007-110011 | 4/2007 |
| JP | A-2007-251013 | 9/2007 |

* cited by examiner

*Primary Examiner* — Binh X Tran
(74) *Attorney, Agent, or Firm* — Posz Law Group, PLC (57) ABSTRACT

A method for manufacturing a thin film magnetic head includes a step for forming an MR layered body; a step for forming a first sacrificial layer made of material removable by wet etching, and subsequently, forming a cap layer on the upper surface of the first sacrificial layer; further, a step for patterning the MR layered body and the cap layer and then filling part of the removed areas of the MR layered body and the cap layer with a bias magnetic layer and the remaining with insulating layers; a step for removing the cap layer by dry etching and, subsequently, removing the first sacrificial layer by wet etching; and a step for forming a second shield layer above the MR layered body and the bias magnetic layer.

6 Claims, 8 Drawing Sheets

METHOD FOR MANUFACTURING CPP-TYPE MAGNETORESISTANCE EFFECT ELEMENT

BACKGROUND OF THE INVENTION

1. Field of the Invention

The present invention relates to a method for manufacturing a thin film magnetic head and particularly relates to a method for manufacturing a thin film magnetic head having a current perpendicular to the plane (CPP) type magnetoresistance effect element.

2. Description of the Related Art

As the reproducing element of a thin film magnetic head, a giant magneto-resistance (GMR) element is widely known. Although a current in plane (CIP)-GMR element is mainly used conventionally that allows a sense current to flow in the direction parallel to the film surface of an element, elements having a CPP structure that allow a sense current to flow in the direction orthogonal to the film surface of the elements have lately been developed in order to meet higher recording density. As this type of element, a CPP-GMR element that is the abovementioned GMR element having a CPP structure and a tunnel magneto-resistance (TMR) element using the TMR effect are known.

A CPP type element conventionally has a layered body (MR layered body, or MR stack) that constitutes a magnetoresistance film and has a magnetic layer (free layer) whose magnetization direction changes in response to an external magnetic field, a magnetic layer (pinned layer) whose magnetization direction is pinned relative to an external magnetic field and a nonmagnetic intermediate layer that is sandwiched between the pinned layer and the free layer. Moreover, both ends of an MR layered body in the layering direction is magnetically shielded by shield layers that also serve as electrodes for supplying a sense current to the MR layered body. The free layer is made to have a single domain by a bias magnetic field applied from bias magnetic layers, for example, provided on both sides of an MR layered body in the track width direction. As a result, the linearity of resistance change in response to the change in an external magnetic field can not only be enhanced, but Barkhausen noises can also be suppressed effectively. A relative angle between the magnetization direction of the free layer and the magnetization direction of the pinned layer changes in response to an external magnetic field. As a result, the electric resistance of a sense current that flows in the direction orthogonal to the film surface of a layered body changes. An external magnetic field can be detected by using this property.

In such a CPP type reproducing head, the base substrate including an MR layered body is placed in the air before a shield layer is formed on the upper portion of the MR layered body in the layering direction. At the time, a cap layer is provided on the upper surface of the MR layered body as a protecting layer in order to prevent the characteristics of the element from deteriorating due to the oxidation of the upper surface of the MR layered body. The cap layer is generally constituted of conductive material that is so-called heavy metal in view of process durability. The oxidized film formed on the surface of the cap layer by the abovementioned exposure to the air results in contact resistance between the cap layer and the upper shield layer, which leads to the deterioration of the characteristics of an element. For this reason, the surface of the cap layer needs to be removed before forming the shield layer. For the removal of the cap layer, dry etching such as ion etching and a reactive ion etching (RIE) is generally used. However, at the time of removing the cap layer made of heavy metal by etching, chemical elements of the cap layer are thrown into the MR layered body by a physical collision of ions (or ion implanting) at the time of etching, which inevitably causes damage to an element.

In order to decrease the influence of dry etching, Japanese laid-open application No. 2005-032780 proposes the structure of a cap layer that allows mitigating the damage to an MR layered body by shortening time required for removing the cap layer by dry etching. In this disclosure, the cap layer is constituted of two or more conductive layers; of those two or more conductive layers, a conductive layer on the shield layer side is constituted of a first material that is hardly oxidized or has small resistance if oxidized; and at least one remaining conductive layers are constituted of a second material containing chemical elements that are relatively high in oxygen binding energy compared with chemical elements constituting the major magnetic layer of the MR layered layer. As a result, the first material provided on the surface side of the cap layer allows decreasing the thickness of an oxidized film formed on the surface of the cap layer, and the second material provided on the MR layered body side allows decreasing the oxidation of the magnetic layer of the MR layered body, resulting in a rise in the MR ratio. It is therefore possible to reduce the deterioration of the characteristics of the MR layered body by dry etching by means of the first material that allows shortening the time required for the etching step and the second material that contributes to a rise in the MR ratio.

There is a need for a cap layer as thin as possible for higher linear recording density, that is, for the reduction of a gap between upper and lower shield layers (i.e., a read gap). In the cap layer having the abovementioned structure, however, the MR layered body may significantly be damaged by chemical elements in the cap layer that are thrown into the MR layered body if dry etching is conducted for a long time in order to sharply reduce the thickness of the cap layer. In addition, it is difficult to control the stop position of dry etching in the case of removing the entire cap layer, which may cause damage to the MR layered body due to over-etching or variation in the characteristics of the MR layered body due to the variation in stop position.

SUMMARY OF THE INVENTION

The present invention is directed to a method for manufacturing a CPP type thin film magnetic head having an MR layered body that has at lease two magnetic layers and constitutes a magnetoresistance effect film, wherein a bias magnetic layer is provided on the opposite side of the MR layered body as seen from an air bearing surface (ABS). The object of the present invention is to provide a method for manufacturing a thin film magnetic head that allows preventing the deterioration of the characteristics of an MR layered body arising out of the removal of a cap layer by dry etching and contributes the reduction of a read gap by reducing the thickness of the cap layer or totally removing it.

According to an embodiment of the present invention, it is disclosed that a method for manufacturing a thin film magnetic head which includes a magnetoresistance (MR) layered body including first and second magnetic layers, at least one of which changes its magnetization direction in response to an external magnetic field, and a nonmagnetic intermediate layer, wherein the first magnetic layer, the nonmagnetic layer and the second magnetic layer are sequentially layered by contacting each other; first and second shield layers that function as electrodes for allowing a sense current to flow in a direction orthogonal to the film surface of the MR layered body and are provided in a manner of sandwiching the MR layered body in the direction orthogonal to the film surface of the MR layered body, wherein the first shield layer is provided below in a layering direction and the second shield layer above in the layering direction; and a bias magnetic layer on the lateral surface of part of the MR layered body for applying a bias magnetic field to the MR layered body. The method includes: an MR layered body forming step for forming the MR layered body on the upper surface of the first shield layer; a cap layer forming step for forming a first sacrificial layer made of material removable by wet etching above the MR layered body and, subsequently, forming a cap layer on the upper surface of the first sacrificial layer; a bias magnetic layer forming step for patterning (or forming a predetermined shape, for example, a column shape) the MR layered body and the cap layer and then filling part of the removed areas of the MR layered body and the cap layer with the bias magnetic layer and the remaining with insulating layers; a first sacrificial layer removing step for removing the cap layer by dry etching and, subsequently, removing the first sacrificial layer by wet etching; and a second shield layer forming step for forming the second shield layer above the MR layered body and the bias magnetic layer.

In such a method for manufacturing a thin film magnetic head, a first sacrificial layer is formed between a cap layer and an MR layered body. As a result, chemical elements in the cap layer that are thrown (or implanted) into can be stopped at the first sacrificial layer at the time of removing the cap layer by dry etching, thereby preventing them from reaching the MR layered body lying beneath the first sacrificial layer. Accordingly, the cap layer can be removed without influencing the characteristics of the MR layered body. Moreover, the first sacrificial layer is removed by wet etching; therefore the characteristics of the MR layered body lying beneath the first sacrificial layer will not be influenced.

Furthermore, the first sacrificial layer lying beneath the cap layer is eventually removed, which reduces the demand for controlling the stop position of dry etching, a problem at the time of removing the entire cap layer. Accordingly, there is no possibility that the characteristics of an MR layered body are aggravated or varied.

Thus, the deterioration of the characteristics of an MR layered body arising out of the removal of a cap layer by dry etching can be prevented, and the thickness of a cap layer can be reduced or the entire cap layer can be removed. Accordingly, it is possible to provide a method for manufacturing a thin film magnetic head that contributes to the reduction of a read gap.

The abovementioned or other objects, features and advantages of the present invention will be readily apparent by a description given below by referring to the attached drawings that illustrate the present invention.

BRIEF DESCRIPTION OF THE DRAWINGS

FIG. 4A~FIG. 5C are step diagrams explaining a method for manufacturing the thin film magnetic head according to one embodiment of the present invention.

EXPLANATION OF PREFERRED EMBODIMENTS

Next, a description of a method for manufacturing the thin film magnetic head according to one embodiment of the present invention is given below by referring to the drawings. As the structure example of a thin film magnetic head to be produced, it will be described herein a thin film magnetic head having a pair of magnetic layers that are magnetically controlled by shield layers, wherein it is essential to remove the entire cap layer in view of the operating principle.

Figure 1:
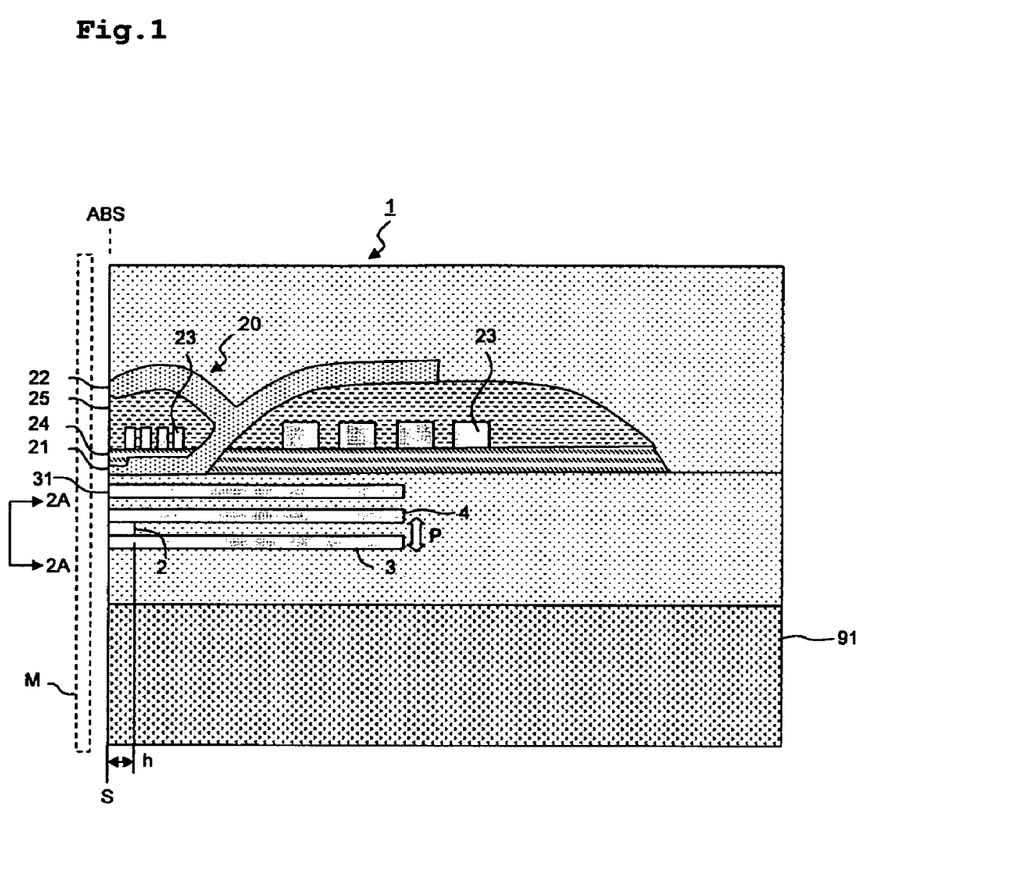
FIG. 1 is a lateral sectional view of a thin film magnetic head of one structure example produced by a method for manufacturing the thin film magnetic head according to one embodiment of the present invention.
Figure 2A:
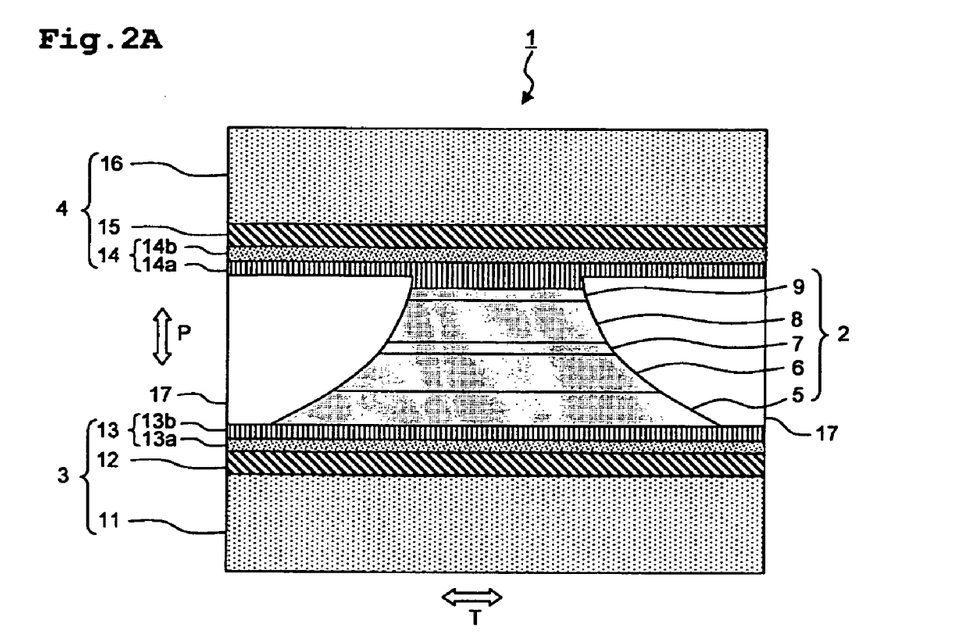
FIG. 2A is a lateral view of the reading part of the thin film magnetic head as seen from the direction of 2A-2A in FIG. 1.
Figure 2B:
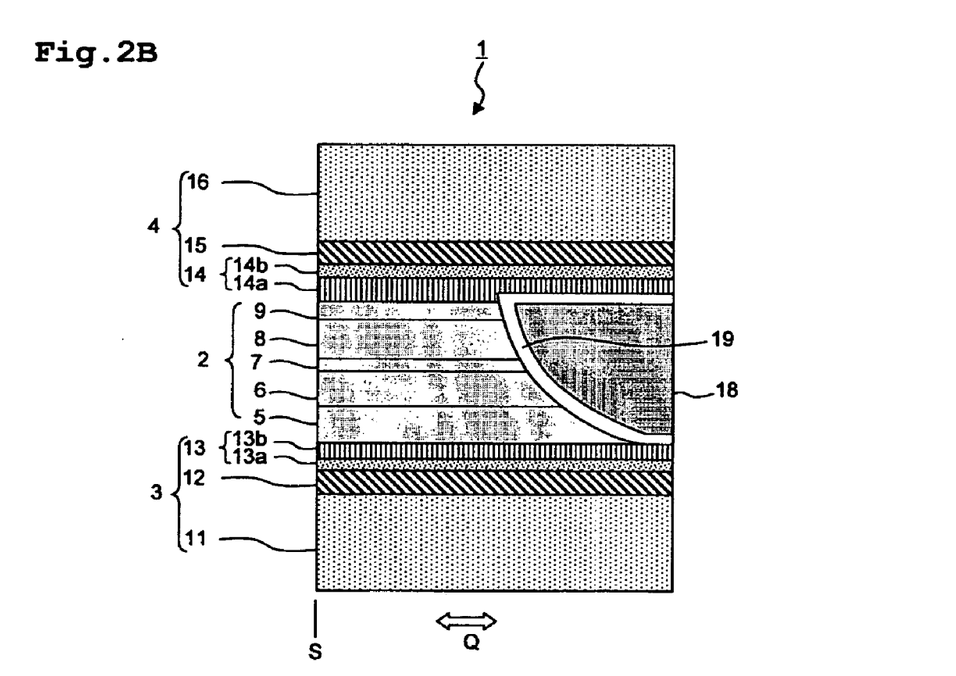
FIG. 2B is a sectional view of the reading part of the thin film magnetic head as seen from the same direction as in FIG. 1.
Figure 3:
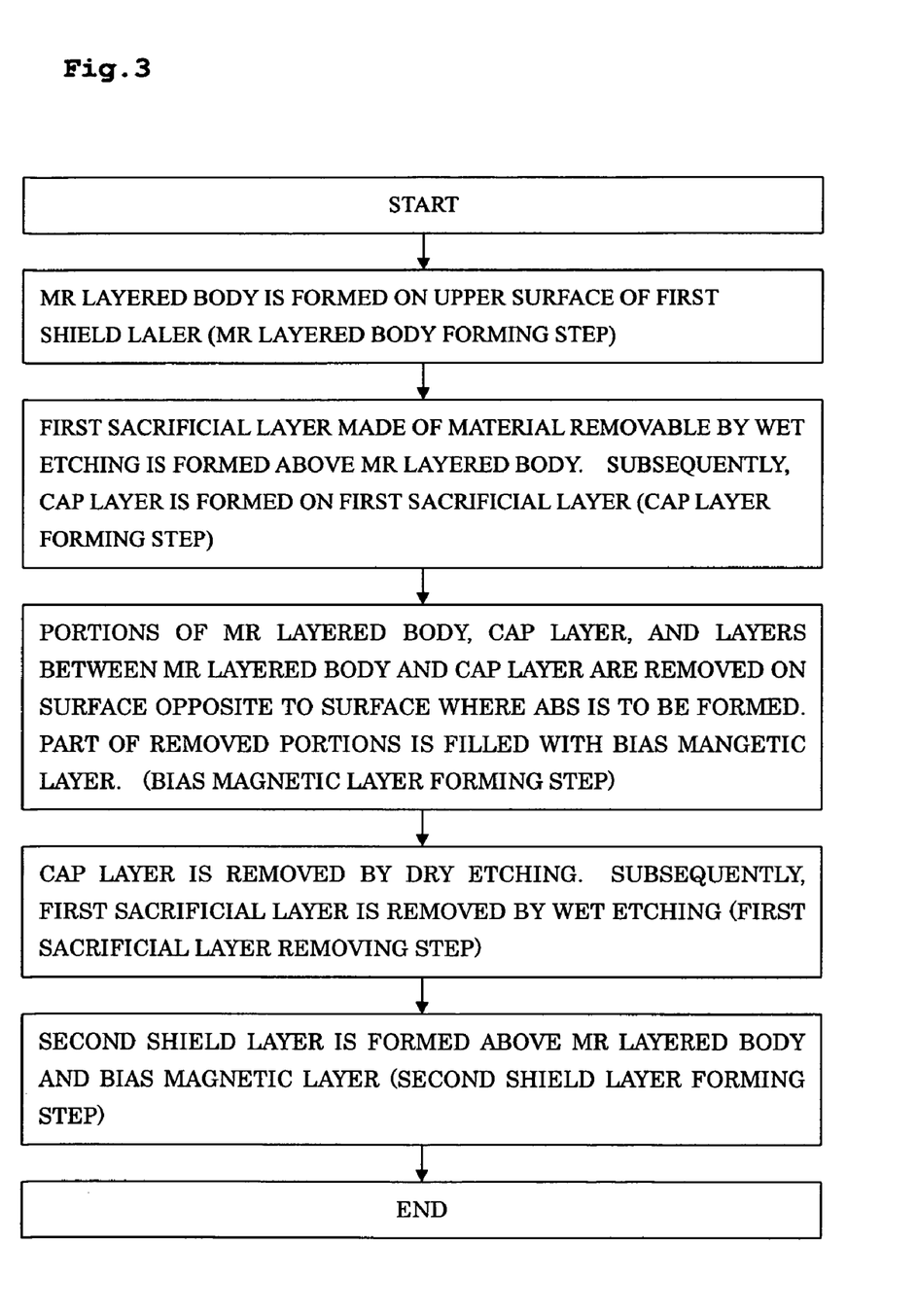
FIG. 3 is a flow diagram explaining a method for manufacturing the thin film magnetic head according to one embodiment of the present invention.

First, a description of the structure example of the abovementioned thin film magnetic head is given below by referring to FIG. 1 and FIG. 2. FIG. 1 is a lateral sectional view of the thin film magnetic head according to the present embodiment. FIG. 2A is a lateral view of the reading part of the thin film magnetic head as seen from the direction of 2A-2A in FIG. 1 (i.e., as seen from an air bearing surface (ABS) S). FIG. 2B is a sectional view of the reading part of the thin film magnetic head as seen from the same direction as in FIG. 1. The ABS S refers to the surface of a thin film magnetic head 1 opposed to a recording medium M.

The thin film magnetic head 1 has a MR layered body 2 and first and second shield layers 3 and 4, respectively, disposed in a manner of sandwiching the MR layered body 2 in the direction P orthogonal to the film surface of the MR layered body 2. Table 1 shows the film structure of the MR layered body as well as the first and second shield layers 3 and 4, respectively. The table describes the first shield layer 3 on the bottom up to the second shield layer 4 in order of lamination.

TABLE 1

| | Layer Structure | | Thickness (nm) | Magnetization Direction |
|---|---|---|---|---|
| Second shield layer 4 | Second main shield layer 16 | NiFe layer | 1000 | |
| | Second antiferromagnetic layer 15 | IrMn layer | 6 | |
| | Second ECMF application layer 14 | CoFe layer 14b | 1.5 | ← |
| | | NiFe layer 14a | 10 | |
| MR layered body 2 | First magnetic linkage layer 9 | Ru layer | 0.8 | |
| | Second magnetic layer 8 | CoFe layer | 3 | → |
| | Nonmagnetic intermediate layer 7 | MgO layer | 1 | |

TABLE 1-continued

| Layer Structure | | | Thickness (nm) | Magnetization Direction |
|---|---|---|---|---|
| | First magnetic layer 6 | CoFe layer | 3 | ← |
| | First magnetic linkage layer 5 | Ru layer 5c | 0.8 | |
| | | CoFe layer 5b | 1 | → |
| | | Ru layer 5a | 0.8 | |
| First shield layer 3 | First ECMF application layer 13 | NiFe layer 13b | 10 | ← |
| | | CoFe layer 13a | 1.5 | |
| | First antiferromagnetic layer 12 | IrMn layer | 6 | |
| | First main shield layer 11 | NiFe layer | 1000 | |

As shown in FIG. 2A and Table 1, the MR layered body 2 has a first magnetic layer 6 whose magnetization direction changes in response to an external magnetic field, a nonmagnetic intermediate layer 7 and a second magnetic layer whose magnetization direction changes in response to an external magnetic field. The first magnetic layer 6, the nonmagnetic layer 7 and the second magnetic layer 8 sequentially contact each other. Moreover, a first magnetic linkage layer 5 and a second magnetic linkage layer 9 are provided adjacent to the first magnetic layer 6 and the second magnetic layer 8, respectively.

The first magnetic layer 6 and the second magnetic layer 8 are each a CoFe layer, and the nonmagnetic layer 7 is an MgO layer which is insulating material. In this case, the thin film magnetic head functions as a TMR element. In the case that metal or a semiconductor such as ZnO is used as a nonmagnetic layer 7, the thin film magnetic head 1 functions as a CPP-GMR element.

The first magnetic linkage layer 5 is provided between the first magnetic layer 6 and a first exchange-coupling magnetic field (ECMF) application layer 13 of the first shield layer 3 and functions to transmit an exchange magnetic field to the first magnetic layer 6 from the first ECMF application layer 13 as described below.

Similarly, the second magnetic linkage layer 9 is provided between the second magnetic layer 8 and a second exchange-coupling magnetic field (ECMF) application layer 14 of the second shield layer 4 and functions to transmit an exchange magnetic field to the second magnetic layer 8 from the second ECMF application layer 14 as described below. In this embodiment, the second magnetic linkage layer 9 is a single layered structure of an Ru layer.

The first shield layer 3 and the second shield layer 4 also serve as electrodes that allow a sense current to flow in the direction P orthogonal to the film surface of the MR layered body 2. The first shield layer 3 is provided on the side facing the first magnetic layer 6 via the first magnetic linkage layer 5. The first shield layer 3 has the first ECMF application layer 13, a first antiferromagnetic layer 12 provided on the rear surface of the first ECMF application layer 13 as seen from the first magnetic layer 6 in a manner of contacting the first ECMF application layer 13 and a first main shield layer 11 provided on the rear surface of the first antiferromagnetic layer 12 as seen from the first magnetic layer 6. The first ECMF application layer 13 is constituted of a two-layer of a CoFe layer 13a provided in a manner of contacting the first antiferromagnetic layer 12 and a NiFe layer 13b provided in a manner of contacting both the CoFe layer 13a and the first magnetic linkage layer 5. The first antiferromagnetic layer 12 is made of IrMn and is strongly coupled with the adjacent CoFe layer 13a antiferromagnetically. The first shield layer 11 is an NiFe layer and shields an external magnetic field applied from adjacent bits on the same track of a recording medium M. The structure of the first main shield layer 11 is equivalent to a conventionally well-known shield layer and has a thickness of 1 μm. The first main shield layer 11 is thicker than the first ECMF application layer 13 and the first antiferromagnetic layer 12. Moreover, the first main shield layer 11 generally has a multi-domain structure and, therefore, is high in permeability. Accordingly, the first shield layer 11 effectively functions as a shield.

The structure of the second shield layer 4 is the same as that of the first shield layer 3. In other words, the second shield layer 4 is provided on the side facing the second magnetic layer 8 via the second magnetic linkage layer 9. The second shield layer 4 has the second ECMF application layer 14, a second antiferromagnetic layer 15 provided on the rear surface of the second ECMF application layer 14 as seen from the second magnetic layer 8 in a manner of contacting the second ECMF application layer 14 and a second main shield layer 16 provided on the rear surface of the second antiferromagnetic layer 15 as seen from the second magnetic layer 8. The second ECMF application layer 14 is constituted of a two-layer structure of a CoFe layer 14b provided in a manner of contacting the second antiferromagnetic layer 15 and a NiFe layer 14a provided in a manner of contacting both the CoFe layer 14b and the second magnetic linkage layer 9. The second antiferromagnetic layer 15 is made of IrMn and is strongly coupled with the adjacent CoFe layer 14b antiferromagnetically. The second shield layer 16 is a NiFe layer and shields an external magnetic field applied from adjacent bits on the same track of a recording medium. The structure of the second main shield layer 16 is equivalent to a conventionally well-known shield layer and has a thickness of 1 μm. The second main shield layer 16 is thicker than the second ECMF application layer 14 and the second antiferromagnetic layer 15. Moreover, the second main shield layer 16 generally has a multi-domain structure and, therefore, high in permeability. Accordingly, the second shield layer 16 effectively functions as a shield.

The first and second antiferromagnetic layers 12 and 15 of the first and second shield layers 3 and 4 contact the CoFe layers 13a and 14b of the first and second ECMF application layers 13 and 14, respectively, in order to realize large exchange-coupling strengths (or intensities) that occur between the first antiferromagnetic layer 12 and the CoFe layer 13a and between the second antiferromagnetic layer 15 and the CoFe layer 14b. If the first and second antiferromagnetic layers 12 and 15 contact the NiFe layers 13b and 14a, respectively, the exchange-coupling strengths will become so small that it is difficult to strongly pin the magnetization directions of the first and second ECMF application layers 13 and 14 by means of the first and second antiferromagnetic layers 12 and 15, respectively. The NiFe layers 13b and 14a are provided in order to allow the shield layers to effectively function by improving soft magnetic characteristics thereof.

As shown in FIG. 2A, insulating layers 17 made of $Al_2O_3$ are formed on both sides of the MR layered body 2 in the track width direction. The provision of the insulating layers 17 allows a sense current flowing in the direction P orthogonal to the film surface of the MR layered body 2 to concentrate on the MR layered body. The insulating layers 17 may be formed on the lateral sides of the MR layered body with a thickness necessary for insulation and may have conductive films thereoutside. In that case, however, the first shield layer 3 and the second shield layer 4 need to be insulated from each other as well.

As shown in FIG. 2B, on the opposite surface of the ABS S of the MR layered body is provided a bias magnetic field application layer 18 via an insulating layer 19 made of $Al_2O_3$. The bias magnetic field application layer 18 is a hard magnetic film made of CoPt, CoCrPt or the like and allows applying a bias magnetic field to the MR layered body in the direction Q orthogonal to the ABS S. The insulating layer 19 prevents a sense current from flowing into the bias magnetic field application layer 18.

As shown in FIG. 1, the upper shield layer 4 is provided with a writing part 20 via an interelement shield layer 31 formed by sputtering or the like. The writing part 20 has a structure for so-called perpendicular magnetic recording. A magnetic layer for writing has a main magnetic pole layer 21 and an auxiliary magnetic pole layer 22. These magnetic pole layers 21 and 22 are formed by a flame plating method or the like. The main magnetic layer 21 is formed of CoFe and is exposed at the ABS S in the direction substantially orthogonal to the ABS S. The circumference of the main magnetic pole layer 21 is wound by a coil layer 23 that extends over a gap layer 24 made of insulating material. The coil layer 23 allows inducing magnetic flux to the main magnetic pole layer 21. The coil layer 23 is formed by a frame plating method or the like. The magnetic flux is guided inside the main magnetic pole layer 21 and released toward a recording medium from the ABS S. The magnetic pole layer 21 is narrowed in the vicinity of the ABS S not only in the direction P orthogonal to the film surface but also in the track width direction T (i.e., the direction orthogonal to paper surface in FIG. 1; see also FIG. 2A) and generates a minute and strong writing magnetic field that is required for higher recording density.

The auxiliary magnetic pole layer 22 is a magnetic layer magnetically coupled with the main magnetic pole layer 21. The auxiliary magnetic pole layer 22 is a magnetic pole layer that is formed of an alloy made of two or three selected from the group consisting of Ni, Fe and Co and has a thickness of about 0.01 μm~about 0.5 μm. The auxiliary magnetic pole layer 22 is provided in a manner of branching from the main magnetic pole layer 21 and is opposed to the main magnetic pole layer 21 on the ABS S side via the gap layer 24 and a coil insulating layer 25. On the end part of the auxiliary magnetic pole layer 22 of the ABS S side is formed a trailing shield part that has a wider cross section than the other portions of the auxiliary magnetic pole layer 22. The provision of such auxiliary magnetic pole layer 22 allows making the magnetic field gradient between the auxiliary magnetic pole layer 22 and the main magnetic pole layer 21 steeper in the vicinity of the ABS S. As a result, output signal jitter is reduced, thereby making an error rate smaller at the time of reading.

Next, the operating principle of reading magnetic information recorded in a recording medium by the thin film magnetic head will be briefly described below.

First, the magnetization state of each layer in the magnetic field-free state where no magnetic field is applied will be explained. Table 1 shows one example of the magnetization direction of each layer.

The first antiferromagnetic layer 12 and the second antiferromagnetic layer 15 are magnetized in advance in such a way that the magnetization direction of the first ECMF application layer 13 antiferromagnetically coupled with the first antiferromagnetic layer 12 becomes the same as the magnetization direction of the second ECMF application layer 14 antiferromagnetically coupled with the second antiferromagnetic layer 15 (e.g., left pointing; see Table 1). The CoFe layer 5b of the first magnetic linkage layer 5 is exchange-coupled with the first ECMF application layer 13 via the Ru layer 5a of the first magnetic linkage layer 5. When the Ru layer has a thickness as shown in Table 1, the exchange-coupling strength is negative, and the magnetization direction of the CoFe layer 5b of the first magnetic linkage layer 5 becomes opposite to the magnetization direction of the first ECMF application layer 13 (e.g., right pointing; see Table 1). Similarly, the CoFe layer 5a and the first magnetic layer 6 are exchange-coupled with each other via the Ru layer 5c, and the magnetization direction of the first magnetic layer 6 becomes opposite to the magnetization direction of the CoFe layer 5c (e.g., left pointing; see Table 1) because of the negative exchange-coupling strength of Ru. The same is true for the magnetization directions of the second antiferromagnetic layer 15, the second ECMF application layer 14, the second magnetic linkage layer 9 and the second magnetic layer 8, and therefore the magnetization direction of the second magnetic layer 8 becomes opposite to the magnetization direction of the second ECMF application layer 14 (e.g., right pointing; see Table 1). As a result, the first magnetic layer 6 and the second magnetic layer 8 are magnetized in a direction antiparallel to each other in the magnetic field-free state.

Here, a bias magnetic field is applied toward the ABS S in the direction orthogonal to the ABS S from the bias magnetic layer 18 provided on the rear surface of two magnetic layers 6 and 8 and the nonmagnetic intermediate layer 7 as seen from the ABS. The magnetization directions of the first magnetic layer 6 and the second magnetic layer 8 are each rotated toward the ABS S under the influence of the bias magnetic field. As a result, the magnetization directions of the first magnetic layer 6 and the second magnetic layer 8 are rotated toward the parallel state from the antiparallel state, forming a given relative angle.

When an external magnetic field is applied to the recording medium M in the direction orthogonal to the ABS S in this state, a relative angle between the magnetization directions of the first magnetic layer 6 and the second magnetic layer 8 changes in response to the direction of the external magnetic field. As a result, the electric resistance of a sense current also changes. Thus, it is possible to detect an external magnetic field by using a change in a relative angle between the magnetization directions of the first magnetic layer 6 and the second magnetic layer 8.

Next, a description of a method for manufacturing the thin film magnetic head according to the present invention is given below by referring to a flow diagram in FIG. 3, FIG. 4A~FIG. 4F and FIG. 5A~FIG. 5C. FIG. 4A~FIG. 4F and FIG. 5A~FIG. 5C are side views of the reading part of a thin film magnetic head as seen from the 2A-2A direction in FIG. 1, i.e., from the ABS S.

A method for manufacturing the thin film magnetic head according to the present invention having a film structure as shown in Table 1 will be explained below. Needless to say, its features can be applied to methods for manufacturing other film structures of thin film magnetic heads such as a TMR element and a CPP-GMR element.

Figure 4A:
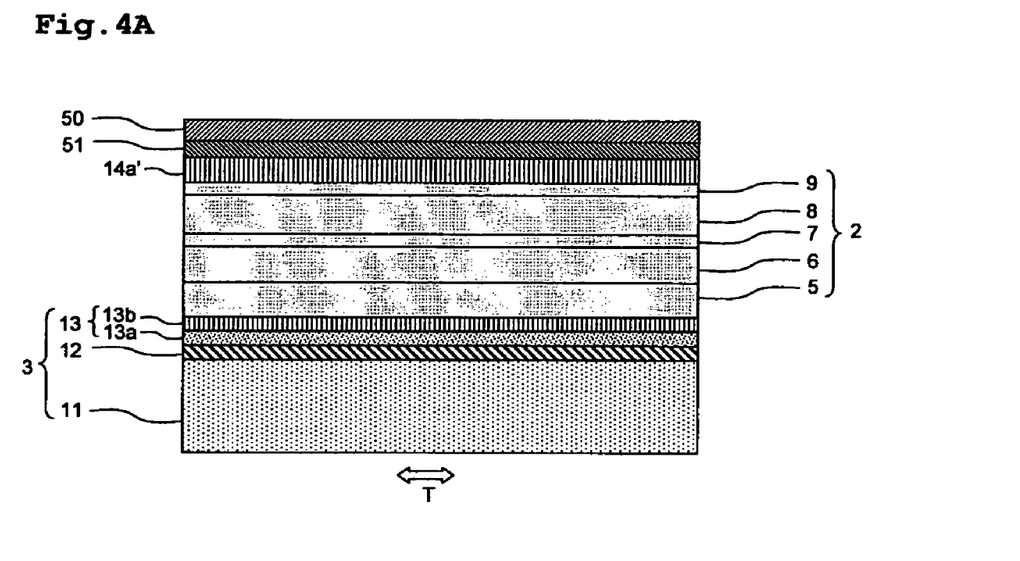

(S1) First, as shown in FIG. 4A, an MR layered layer 2 is formed by sputtering on the upper surface of a first shield layer 3, which is formed by sputtering on a substrate 91 (not shown in FIG. 4A; see FIG. 1) (MR layered body forming step). As described above, the MR layered body 2 has a first magnetic layer 6 whose magnetization direction changes in response to an external magnetic field, a nonmagnetic intermediate layer 7 and a second magnetic layer 8 whose magnetization direction changes in response to an external magnetic field. The first magnetic layer 6, the nonmagnetic intermediate layer 7 and the second magnetic layer 8 are sequentially formed on the first shield layer 3 via first magnetic linkage layer 5. Also, as described above, the first shield layer 3 has a first main shield layer 11, a first exchange-coupling magnetic field (ECMF) application layer 13 and a first antiferromagnetic layer 12. The first ECMF application layer 13 that allows applying an exchange-coupling magnetic field to the first magnetic layer 6 in the direction parallel to the ABS S is provided on the main shield layer 11 via the first antiferromagnetic layer 12 that is antiferromagnetically coupled with the first ECMF application layer 13 in a manner of facing the first magnetic layer 6, i.e., in a manner of being disposed on the upper surface side of the first shield layer 3.

Next, a second magnetic linkage layer 9 by sputtering is formed on a second magnetic layer 8. Furthermore, a part of a NiFe layer 14a is formed on the second magnetic linkage layer 9 (hereinafter the part is referred as NiFe layer 14a') that will become the abovementioned second ECMF application layer 14 in order to protect the second magnetic linkage layer 9 from the process such as etching as described below.

(S2) Next, a first sacrificial layer 51 is formed by sputtering on the upper surface of the NiFe layer 14a'. Subsequently, a cap layer 50 is formed on the first sacrificial layer 51 (cap layer forming step; see FIG. 4A). The first sacrificial layer 51 is made of material that is dissolvable in a wet etching solution such as phosphate solution, hydrofluoric acid and phosphoric acid solution, and that is removable by a wet etching. The first sacrificial layer 51 may be made of any one of $Al_2O_3$, $SiO_2$ and SiN. The cap layer 50 is provided to prevent an oxidized layer, a factor of deteriorating the characteristics of an element, from being formed on the surface at a time when the MR layered body 2 is placed in the air before a second shield layer forming step as described below. It is therefore preferred that the cap layer made of conductive material is hardly oxidized or has low resistance if oxidized. In view of resist patterning, the cap layer 50 is limited to elements having relatively high specific gravity as shown below. The cap layer 50 may be a layer made of Ta, Cr, Ti, Ru, Rh, W, Hf, Nb, Zr, Mo, Au, Ir, Pt, Ag, V, Pd or Cu or a combination containing at least one of them.

Figure 4B:
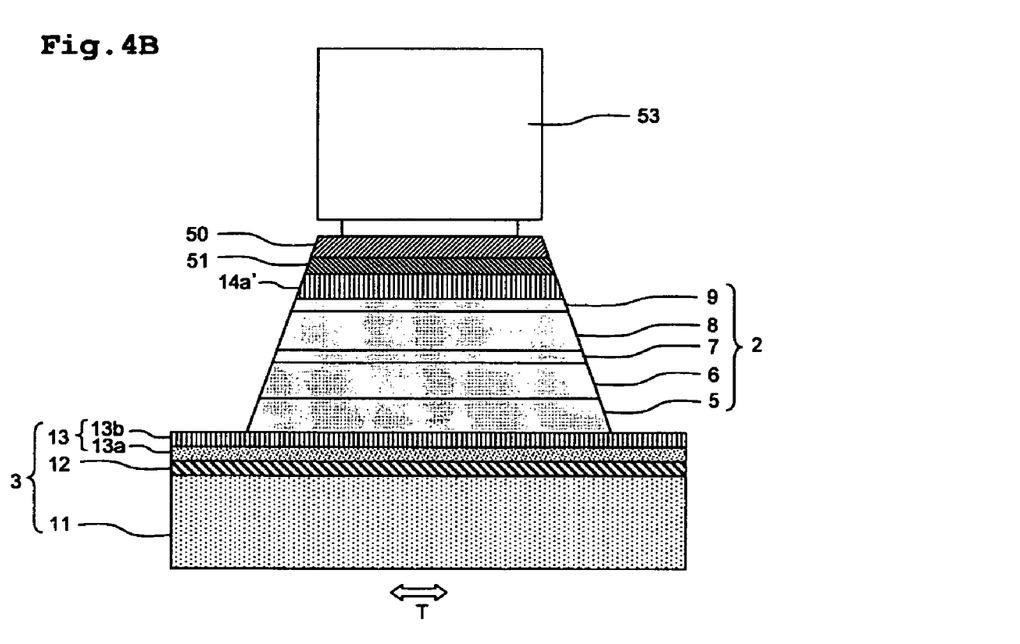
Figure 4C:
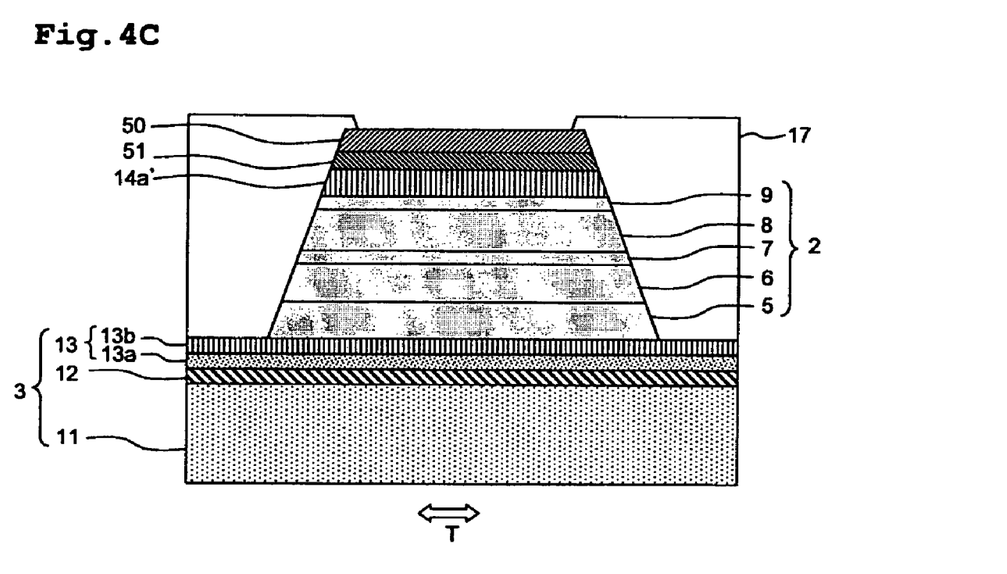

(S3) Next, portions of layers spanning from cap layer 50 to first magnetic linkage layer 5 of the MR layered body 2 are removed on the surface opposite to the surface where the ABS S is to be formed, resulting in forming a designated shape. Then a part of the removed areas is filled with a bias magnetic layer (bias magnetic layer forming step). Specifically, as shown in FIG. 4B and FIG. 4C, a resist 53 is formed on the upper surface of the cap layer 50; portion of layers spanning from cap layer 50 to first magnetic linkage layer 5 is removed using the resist 53 as a mask; and then portions on both sides in the track width direction T is filled with insulating layers 17. Subsequently, the resist 53 is removed by a lift-off method, and then all the portions (or areas) are milled except for the portion corresponding to the height h (see FIG. 1) of the element from the ABS S. Then, a bias magnetic layer 18 is formed via an insulating layer 19 using a new resist pattern (not shown here) for forming the bias magnetic layer 18 (see FIG. 2B). Thus, the insulating layers 17 are formed on both lateral surfaces in the track width direction T of the MR layered body 2 and the bias magnetic layer 18 formed on the surface opposite to the MR layered body 2 as seen from the ABS S.

Figure 4D:
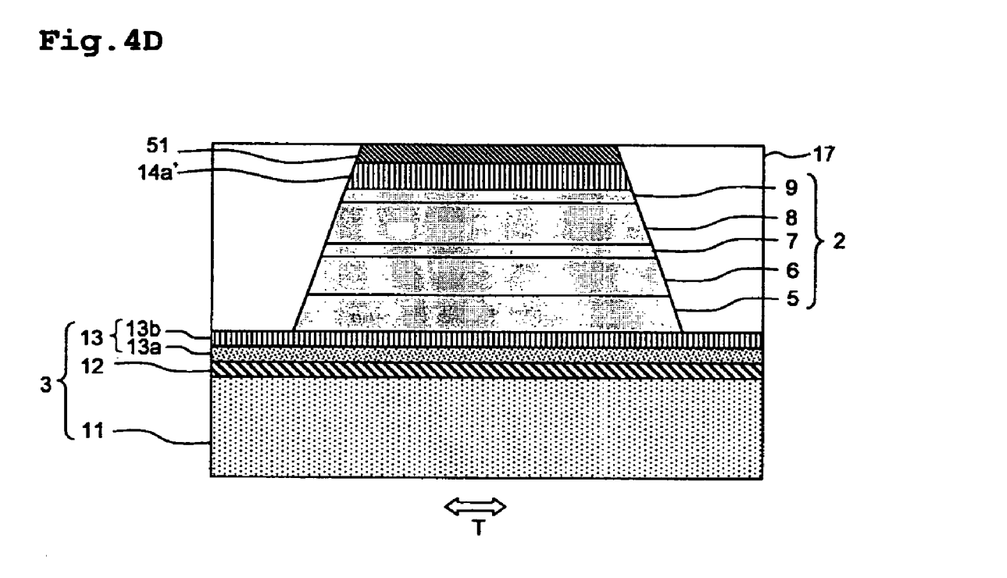
Figure 4E:
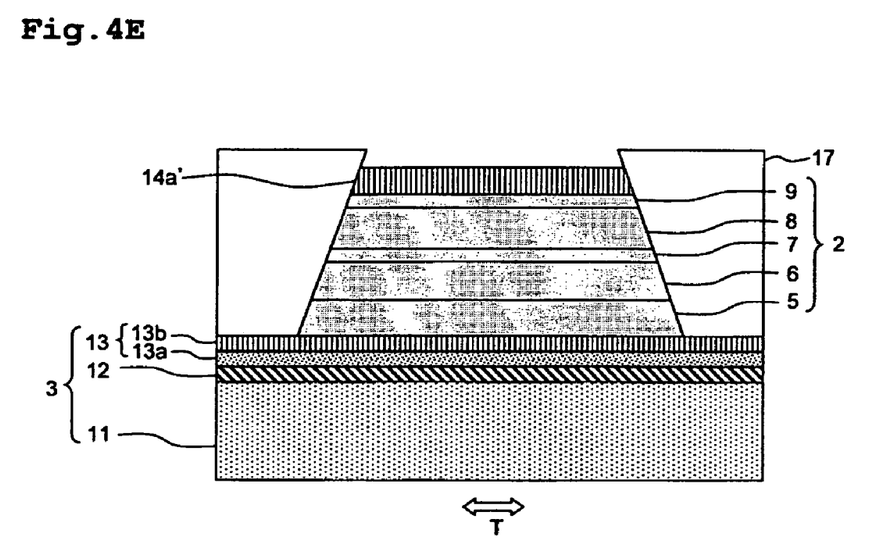

(S4) Next, as shown in FIG. 4D and FIG. 4E, the cap layer 50 is removed by dry etching. Subsequently, the first sacrificial layer 51 is removed by wet etching (first sacrificial layer removing step). The cap layer 50 may be removed by dry etching such as an ion beam etching and a reactive ion etching (RIE). Here, chemical elements in the cap layer are thrown into the layer disposed lower than the cap layer by the physical collision of ions at the time of dry etching. However, these chemical elements remain in the first sacrificial layer 51 and never reach the layer disposed lower that the first sacrificial layer 51. As described above, the first sacrificial layer 51 can be removed using wet etching solution such as phosphate solution, hydrofluoric acid and phosphoric acid solution and, therefore, never influence the layer disposed lower than the first sacrificial layer 51.

Figure 4F:
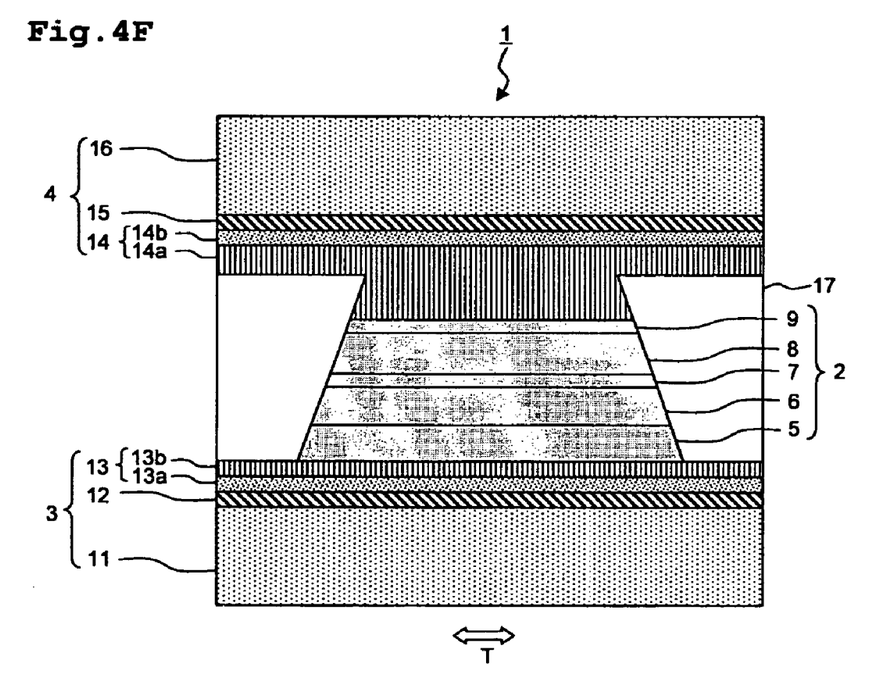

(S5) Next, as shown in FIG. 4F, a second shield layer 4 having a second exchange-coupling magnetic field (ECMF) application layer 14, a second antiferromagnetic layer 15 and a second main shield layer 16 is formed above the MR layered body 2 and the bias magnetic layer 18 (second shield layer forming step). Specifically, NiFe is accumulated by sputtering on the upper surface of the NiFe layer 14a' exposed by removing the first sacrificial layer 51 in order to form the second ECMF application layer 14 for applying an exchange-coupling magnetic field to the second magnetic layer 8 in the direction parallel to the ABS S. Subsequently, the second main shield layer 16 is formed by plating on the upper surface of the second ECMF application layer 14 via the second antiferromagnetic layer 15 that is antiferromagnetically coupled with the second ECMF application layer 14. Here, a nonmagnetic layer made of Cu or the like (not shown here) may be inserted between the second antiferromagnetic layer 15 and the second main shield layer 16 to enhance the shield performance of the second main shield layer 16 against an external magnetic field.

Subsequently, a writing element is formed; the substrate (wafer) is cut into a bar; the ABS is formed by polishing; the bar is separated into a slider; and finally a slider is completed after steps of washing, inspection, etc.

Figure 5A:
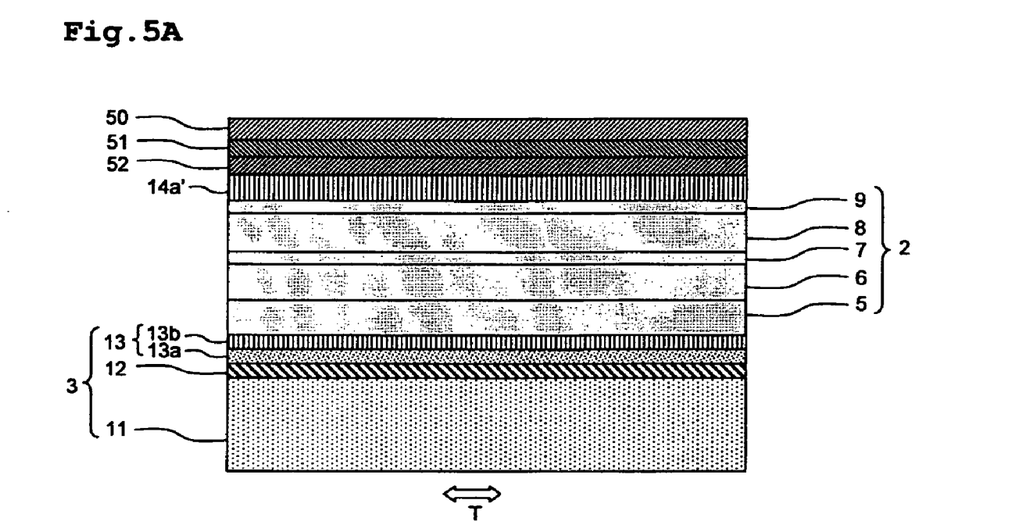
Figure 5B:
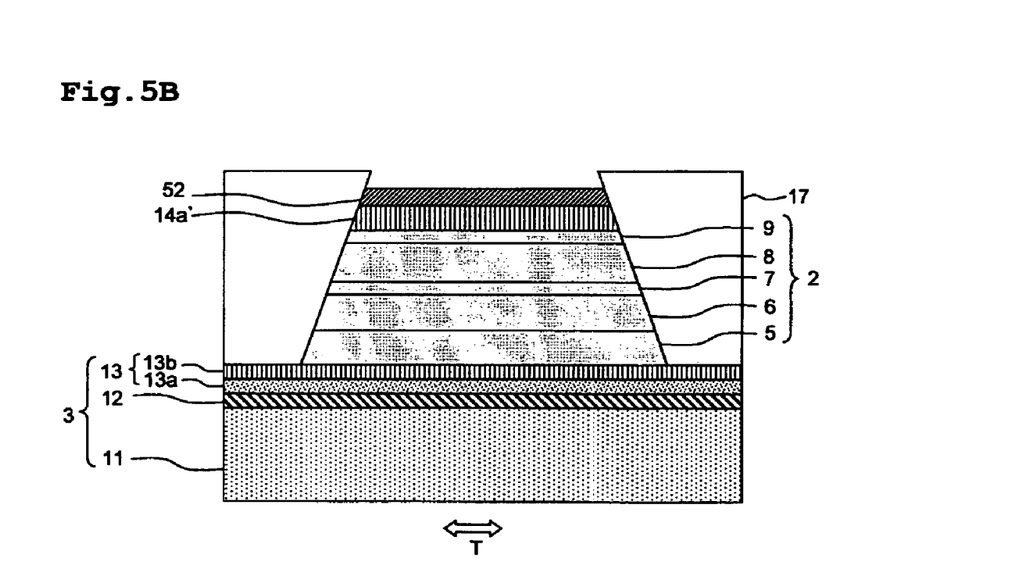
Figure 5C:
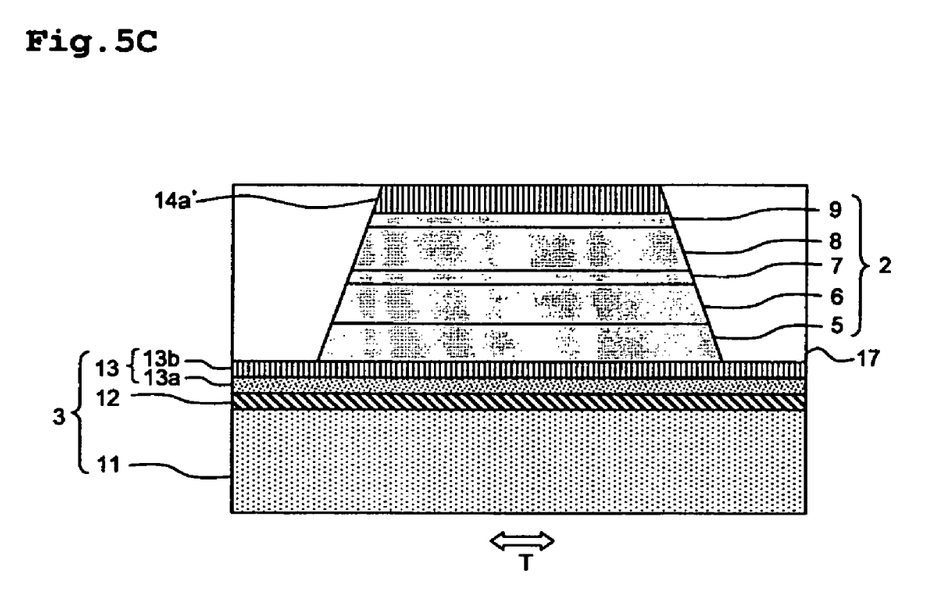

In the cap layer forming step, as shown in FIG. 5A, a second sacrificial layer 52 made of material removable by dry etching may be formed between the NiFe layer 14a' of the second ECMF application layer 14 on the upper surface of the MR layered body 2 and the first sacrificial layer 51. In this case, the second sacrificial layer 52 can be removed by dry etching such as an ion beam etching and a reactive ion etching after removing the first sacrificial layer 51 and before the second shield layer forming step, as shown in FIG. 5B and FIG. 5C.

The substrate containing the MR layered body 2 is placed in air (or exposed to air) after the first sacrificial layer 51 is removed, as described above, because separate devices are used for removing the first sacrificial layer 51 and the second shield layer 4. In the case that only the first sacrificial layer 51 is used, therefore, an oxidized layer may be formed on the surface of the MR layered body 2 exposed after the first sacrificial layer 51 is removed, which may influence the characteristics of the element. On the other hand, in the case that the second sacrificial layer 52 is used in addition to the first sacrificial layer 51, there occurs no exposure of the MR layered body 2 in air after the first sacrificial layer 51 is removed because there is the second sacrificial layer 52 beneath the first sacrificial layer 51. Moreover, the second sacrificial layer 52 can be removed in the same vacuum device that the second shield layer 4 is formed; therefore there occurs no exposure of the MR layered body in the air even after the second sacrificial layer 52 is removed. Thus, the use of the second sacrificial layer 52 has the advantage that the MR layered body 2 can be prevented from being exposed to air and that the characteristics of an element can be prevented from being deteriorated.

Material used for the second sacrificial layer 52 should only withstand the exposure in the air at the time of replacing devices after the first sacrificial layer 51 is removed. The second sacrificial layer 52 may therefore be made of any one of Al, Mg, B, C and Be. Since the specific gravity(s) of the abovementioned chemical elements is low, chemical elements in the second sacrificial layer 52 are hardly thrown into the MR layered body 52 by dry etching so that the characteristics of an element are deteriorated.

(Embodiment) Next, the reproduction performance of thin film magnetic heads made by the production method according to the present embodiment will be evaluated. Specifically, a wafer was cut, which had the MR layered body 2 formed and was annealed in a magnetic field at 250° C. for three hours, into a bar (BAR) having 120 elements to make a reproduction head test sample. A BAR-Quasi-Static Test (QST) by applying an external magnetic field of ±40000 A/m to the reproducing element portion was conducted. Then, asymmetry (Asym, %) was measured, a constant for evaluating the asymmetry of reproduction output voltage, for each test sample in order to find a standard deviation Asym-σ. Referring to test samples made under different preparation conditions as Embodiment 1, Embodiment 2 and Comparative Embodiment and compared Asym-σ (%) among them. Table 2 shows the preparation conditions.

A sample made by using the first sacrificial layer 51 and the cap layer 50 were referred to Embodiment 1. AlO of 4 nm in thickness for the first sacrificial layer 51 and Ta of 2.5 nm in thickness for the cap layer 50 were used.

A sample made by using the second sacrificial layer 52 in addition to the first sacrificial layer 51 and the cap layer 50 were referred to Embodiment 2. Mg of 1 nm in thickness for the second sacrificial layer 52 were used. The first sacrificial layer 51 and the cap layer 50 were made under the same conditions as those in Embodiment 1.

Also, a sample made by a conventional production method, i.e., a sample made by using only the cap layer 50 without using the sacrificial layers 51 and 52 was referred to Comparative Embodiment. Ta of 2.5 nm in thickness for the cap layer like Embodiments was used.

Table 2 shows the results of Asym-σ (%), standard deviation of the asymmetry of test samples thus produced.

The table clearly shows that the asymmetry property of output voltage was solved and the reproduction performance enhanced in Embodiment 1, which used the first sacrificial layer 52 in addition to the cap layer 50, compared with Comparative Embodiment, which used only the cap layer 50. This seems to be because the soft magnetic characteristics of the MR layered body 2 (in this case the soft magnetic characteristics of the NiFe layer 14a of the second ECMF application layer 14) is significantly different between both cases. In other words, this means that chemical elements in the cap layer 50 was thrown into the NiFe layer 14a of the second ECMF application layer 14 as impurities by removing the cap layer 50 in Comparative Embodiment, resulting in the deterioration of soft magnetic characteristics in the NiFe layer 14a. As a result, soft magnetic characteristics declined in the second magnetic layer 8 as well. Consequently, the external magnetic field responsiveness became unbalanced between the second magnetic layer 8 and the first magnetic layer 6. Accordingly, Asym-σ was markedly poor in Comparative Embodiment. On the other hand, chemical elements in the cap layer 50 were not thrown into the MR layered body 2 in Embodiment 1 as described above. Therefore, the soft magnetic characteristics of the MR layered body 2 did not deteriorate due to impurities. Thus, Embodiment 1 and Comparative Embodiment were different in the soft magnetic characteristics of the MR layered body 2, which led to a marked difference in the asymmetry of output voltage.

The Asym-σ in Embodiment 2 was only slightly better than that in Embodiment 1. As described above, the second sacrificial layer 52 was removed in the same vacuum device that the second shield layer was formed after the first sacrificial layer 51 was removed. Embodiment 2 is therefore different from Embodiment 1 in that the exposure in the air of the upper surface of the MR layered layer 2 was mitigated. The results show that the influence of the exposure in the air after wet etching was not significant in Embodiment 1 compared with Embodiment 2. In other words, it is shown that oxides formed on the surface after wet etching in Embodiment 1 are removable with little effect on the soft magnetic characteristics of the MR layered body 2 (i.e., without oxides being thrown into the lower layer) by dry etching cleaning because they are residual oxides of the first sacrificial layer made of light chemical elements.

Desirable embodiments of the present invention are described. It should be appreciated, however, that a wide variety of variations and modifications are possible without departing from the spirit and scope of the attached claims.

What is claimed is:

1. A method for manufacturing a thin film magnetic head which comprises:
a magnetoresistance (MR) layered body comprising first and second magnetic layers, at least one of which

TABLE 2

| Film structure | | Thickness (nm) | Comparative Embodiment | Embodiment 1 | Embodiment 2 |
|---|---|---|---|---|---|
| Cap layer 50 | Ta layer | 2.5 | ○ | ○ | ○ |
| First sacrificial layer 51 | AlO layer | 4 | — | ○ | ○ |
| Second sacrificial layer 52 | Mg layer | 1 | — | — | ○ |
| Second ECMF application layer 14 | NiFe layer 14a' | 7 | ○ | ○ | ○ |
| Second magnetic linkage layer 14 | Ru layer | 0.8 | ○ | ○ | ○ |
| Asym-σ (%) | | | 15.7 | 5.4 | 5 |

○: formed,
—: not formed changes its magnetization direction in response to an external magnetic field, and a nonmagnetic intermediate layer, wherein the first magnetic layer, the nonmagnetic layer and the second magnetic layer are sequentially layered by contacting each other;

first and second shield layers that function as electrodes for allowing a sense current to flow in a direction orthogonal to the film surface of the MR layered body and are provided in a manner of sandwiching the MR layered body in the direction orthogonal to the film surface of the MR layered body, wherein the first shield layer is provided below in a layering direction and the second shield layer above in the layering direction; and a bias magnetic layer on the lateral surface of part of the MR layered body for applying a bias magnetic field to the MR layered body, the method comprising:

an MR layered body forming step for forming the MR layered body on the upper surface of the first shield layer;

a cap layer forming step for forming a first sacrificial layer made of material removable by wet etching above the MR layered body and, subsequently, forming a cap layer on the upper surface of the first sacrificial layer;

a bias magnetic layer forming step for patterning the MR layered body and the cap layer and then filling part of the removed areas portions of the MR layered body and the cap layer with the bias magnetic layer and the remaining with insulating layers;

a first sacrificial layer removing step for removing the cap layer by dry etching and, subsequently, removing the first sacrificial layer by wet etching; and a second shield layer forming step for forming the second shield layer above the MR layered body and the bias magnetic layer.

2. The method for manufacturing the thin film magnetic head according to claim 1, wherein both the first magnetic layer and the second magnetic layer change their magnetization directions in response to an external magnetic field, wherein the first shield layer comprises:

a first exchange-coupling magnetic field (ECMF) application layer for applying an exchange-coupling magnetic field to the first magnetic layer in the direction parallel to an air bearing surface (ABS); and a first antiferromagnetic layer provided on a rear surface of the first ECMF application layer as seen from the first magnetic layer in a manner of contacting the first ECMF application layer for antiferromagnetically coupling with the first ECMF application layer, wherein the second shield layer comprises:

a second exchange-coupling magnetic field (ECMF) application layer for applying an exchange-coupling magnetic field to the second magnetic layer in the direction parallel to the ABS and antiparallel to the exchange-coupling magnetic field applied to the first magnetic layer by the first ECMF application layer; and a second antiferromagnetic layer provided on the rear surface of the second ECMF application layer as seen from the second magnetic layer in a manner of contacting the second ECMF application layer for antiferromagnetically coupling with the second ECMF application layer, and wherein the cap layer forming step comprises forming part of the second ECMF application layer on the upper surface of the MR layered body before forming the first sacrificial layer.

3. The method for manufacturing the thin film magnetic head according claim 1, wherein the first sacrificial layer is formed of any one of Al2O3, SiO2 and SiN.

4. The method for manufacturing the thin film magnetic head according to claim 1, wherein the cap layer comprises at least one of Ta, Cr, Ti, Ru, Rh, W, Hf, Nb, Zr, Mo, Au, Ir, Pt, Ag, V, Pd and Cu.

5. The method for manufacturing a thin film magnetic head according to claim 1, wherein the cap layer forming step comprises forming the second sacrificial layer made of material removable by dry etching above the MR layered body and, subsequently, forming the first sacrificial layer on the upper surface of the second sacrificial layer, and wherein the first sacrificial layer removing step comprises removing the second sacrificial layer by dry etching after removing the first sacrificial layer.

6. The method for manufacturing the thin film magnetic head according claim 5, wherein the second sacrificial layer is formed of any one of Al, Mg, B, C and Be.

* * * * *